United States Patent [19]

Nicholson et al.

[11] 4,079,119

[45] Mar. 14, 1978

[54] SULFUR DIOXIDE REMOVAL PROCESS

[75] Inventors: Norman E. Nicholson, Stockton-on-Tees; John Scarlett, Kirk Merrington, both of England

[73] Assignee: Davy Powergas, Inc., Lakeland, Fla.

[21] Appl. No.: 637,145

[22] Filed: Dec. 3, 1975

[30] Foreign Application Priority Data

Dec. 13, 1974 United Kingdom ............... 53937/74

[51] Int. Cl.$^2$ ........................ C01B 17/00; C01D 7/00; C01D 15/08; C01D 17/22

[52] U.S. Cl. .................................. 423/242; 423/422; 423/428

[58] Field of Search ............... 423/242, 421, 422, 428, 423/560

[56] References Cited

U.S. PATENT DOCUMENTS

| | | | |
|---|---|---|---|
| 3,401,010 | 9/1968 | Guerrier | 423/428 |
| 3,728,433 | 4/1973 | Urban | 423/242 |
| 3,790,660 | 2/1974 | Earl | 423/242 |
| 3,932,587 | 1/1976 | Granthan et al. | 423/422 |
| 3,966,891 | 6/1976 | Renault et al. | 423/242 |
| 3,971,844 | 7/1976 | Schneider | 423/242 X |

Primary Examiner—O. R. Vertiz
Assistant Examiner—Gregory A. Heller
Attorney, Agent, or Firm—Bernard & Brown

[57] ABSTRACT

There is disclosed a process for reducing the loss of sodium values in a system for removing sulfur dioxide from a gas by the use of an absorption-desorption cycle employing aqueous sodium sulfite as the essential absorption solution. Sodium sulfate and/or sodium thiosulfate build-up in the system is avoided and the loss of sodium values reduced by subjecting sodium sulfate and/or sodium thiosulfate-containing material to chemical reduction to form a product containing a substantial amount of sodium carbonate. Preferably, the reduced product is subjected to carbonation followed by reaction of the bicarbonate and bisulfide components of the mixture to give a resulting liquid which is more suitable for use in the absorption-desorption process. By-product gases can be incinerated to produce sulfur dioxide-containing gases which can be charged to the sulfur dioxide absorption zone. Sodium thiosulfate can be purged from the absorption-desorption system by treating a purge stream from the desorption zone of the process.

22 Claims, 1 Drawing Figure

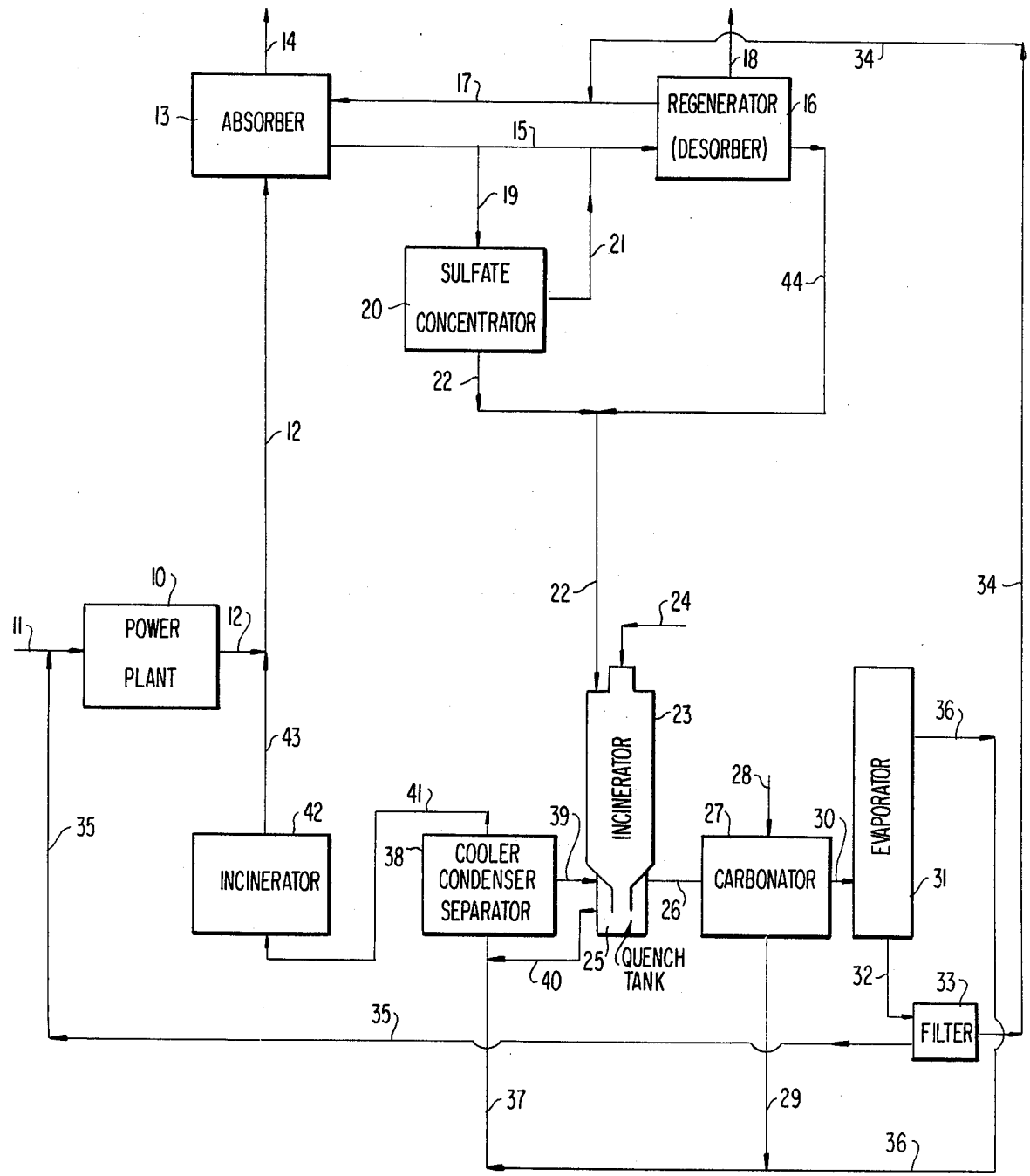

SULFUR DIOXIDE REMOVAL PROCESS

This invention relates to a process for purging sodium sulfate from an absorption-desorption process in which sulfur dioxide is removed from a gas by contact with an aqueous absorbing solution of sodium sulfite, and the metal values of the purged sodium sulfate are converted to a form in which the sodium is active for use in the absorption-desorption system. Sodium thiosulfate can be purged from the absorption-desorption system, and its sodium values recovered for reuse in the absorption-desorption system, by similar treatment of a purge stream from the desorption stage of the system separately or along with the material processed for conversion of sodium sulfate to a form which is active in the absorption-desorption system. The invention also relates to procedures for converting sodium sulfate and/or sodium thiosulfate to such active form.

Sulfur dioxide is a recognized pollutant of the atmosphere and is produced by oxidation of sulfur or sulfur-bearing materials. Sulfur dioxide is found in significant amounts as a constituent of various waste gases such as smelter gases, off-gases from chemical plants, and stack or furnace gases from coal or oil-burning furnaces such as are used in electric power plants. Although the concentration of sulfur dioxide in such gases is generally minor, e.g., from about 0.001 up to about 5 mole percent, and is frequently less than about 0.5 mole percent (less than about 1% by weight), the emission of sulfur dioxide may be substantial, particularly in industrial applications due to the large amount of sulfur-bearing material being processed. For instance, a modern electric plant having a 1,350,000 kw. capacity will burn up to about 15,000 tons of coal per day. Despite the fact that the concentration of sulfur dioxide in the stack gases from the electric plant can be low, e.g., of the order of 0.2 to 0.3 mole percent, the total sulfur dioxide produced may be in the neighborhood of 1,000 tons per day. Similarly, significant amounts of sulfur dioxide are produced in utilization of other fuels which may bear sulfur.

The removal of sulfur dioxide from sulfur dioxide-containing gases may be effected by treatment with an aqueous sodium sulfite solution. The operation of an efficient and economical system for removal of sulfur dioxide will be characterized not only by the efficiency of absorption of sulfur dioxide from the sulfur dioxide-containing gases, the efficiency of desorption of sulfur dioxide from the spent absorbing solution, and the purity of the sulfur dioxide product, but also by the minimization of loss of metal values. Sulfur dioxide-containing gas obtained, for instance, by burning sulfur-containing mineral products and the like, as fuels can be contacted with sodium sulfite in an aqueous solution to form bisulfite, and thereby substantially reduce the sulfur dioxide content of the gas to, for instance, less than about 0.02 mole percent when the sulfur dioxide-containing feed gas comprises more than about 0.2 mole percent sulfur dioxide. The removal of sulfur dioxide from the gases is often up to about 95 percent or more. The spent absorbing solution can be heated to convert the bisulfite to sulfite and sulfur dioxide, and to generate a liquid or liquid-solid material which serves as the source of the absorbing solution. The sulfur dioxide can be drawn-off and cooled or compressed to provide a liquid product or sent as a gas to a sulfuric acid plant or sulfur plant. Regenerated absorbing solution can be recycled to the absorption zone. For additional information and further exemplification regarding sulfur dioxide removal systems which can advantageously incorporate the technology disclosed herein, see U.S. Pat. Nos. 3,607,037, 3,653,812, and 3,790,660, all of which are incorporated herein by reference.

The sulfur dioxide-containing gases to be treated usually contain materials such as sulfur trioxide, oxygen, elemental iron, and the like, and, particularly when the gases containing sulfur dioxide are derived from the combustion of fuel, other materials may be present such as oxides of nitrogen. At least some of these materials promote the oxidation of the sodium sulfite or bisulfite to sulfate which is an inert material for purposes of the sulfur dioxide absorption-desorption process. Sodium thiosulfate and sodium sulfate are also formed to a minor extent in the process by the disproportionation reaction of sodium bisulfite, and as they cannot be regenerated to sulfite in the desorption stage, build-up of sulfate and thiosulfate occurs in the system. A portion of the absorption-desorption medium can be purged from the system to prevent unduly large amounts of inert sulfate and thiosulfate from accumulating in the system. This purge may be a portion of the spent absorption solution or material obtained in the desorption of the sulfur dioxide from the spent absorbing solution. These purge materials, however, contain substantial amounts of sulfite or bisulfite, along with the sulfate and thiosulfate, and when the purge is discarded, an undue expense may occur due to the accompanying loss of useable sodium values from the system which must be replaced by the addition of soluble sodium compounds which are active in the absorption-desorption process. Thiosulfate is made in the system in substantially lesser amounts than is sulfate, and thiosulfate can be purged by, for instance, discarding a portion of the solution undergoing desorption with significantly less loss of metal values than if the purging of sulfate is accomplished in a similar manner.

There have been proposed techniques for the selective purging of sodium sulfate from the described sulfur dioxide removal system, but in these operations at least the metal values of the separated sodium sulfate are still lost to the absorption-desorption system. For example, one can endeavor to separate the sulfate in the purge from the sulfite and/or bisulfite values, and return the latter to the absorbing-desorbing system. Simple separation of sodium sulfate from a mixture of sulfite and bisulfite or from bisulfite by low temperature crystallization gives a sulfate-containing crystallization product having substantial, even if minor, amounts of sodium sulfite and/or sodium bisulfite. Thus, the metal values in the sodium sulfite and bisulfite associated with the sulfate product disadvantageously add to the sodium values lost from the system.

Several methods can be used to concentrate sodium sulfate in the aqueous absorption-desorption medium for more selective purging of sulfate and these procedures may involve one or both of contact with a sulfur dioxide-containing gas and evaporation of water. In a preferred embodiment, sulfate can be selectively removed from the system by treating at least a portion of the aqueous absorption-desorption medium, preferably spent absorption solution, to remove a sufficient amount of water to precipitate a significant, but limited, amount of solids in the medium. Thus the evaporation of water can be conducted in a manner to form up to about 10 weight percent crystals in the absorption-desorption medium, or up to about 20 weight percent especially when the evaporation is conducted while simultaneously charging sulfur dioxide-containing gas to the evaporation stage, preferably a gas that is unsaturated with respect to water. The precipitated solids have an increased amount of sulfate and can be separated and removed from the system as a sulfate purge. In one system for concentrating sodium sulfate so that it can be more economically separated from the sulfur dioxide removal system described above, a purge stream of spent absorbing solution is contacted with a gas containing sulfur dioxide to convert at least a portion of the sodium sulfite to the more soluble bisulfite. The stream is then cooled to crystallizing temperature and sodium sulfate precipitates more selectively. The resulting solids can be separated and discarded from the absorption-desorption system to accomplish the sulfate purge.

In these and other procedures for purging sodium sulfate or sodium thiosulfate from the described sulfur dioxide absorption-desorption system considerable expense is encountered since sodium values are discarded in the form of inert sodium sulfate and thiosulfate, and usually also in the form of one or both of active sodium bisulfite and sulfite. The present invention is directed to processes in which at least a substantial portion of such sodium values are recovered in a form which is active in the absorption-desorption system, and this includes at least a significant amount of the metal values which are formed in the absorption-desorption system as inert sodium sulfate or thiosulfate.

Processes have been proposed for the recovery of such inert sodium values in a form suitable for use in a sulfur dioxide absorption system, but all suffer from various disadvantages. In one such process the total absorbent stream is treated in an electrolytic system to produce sodium hydroxide solution and dilute sulfuric acid. This process thus involves the use of electrochemistry which may be undesirable in the plant which produces the sulfur dioxide-containing gas. The absorbent stream treated contains only a relatively small amount of inactive sulfate to an extent of the order of, for instance, about 7 to 10 weight percent, and the dilute sulfuric acid produced presents a disposal problem. The so-called "double alkali" processes which may be used to treat the sulfur dioxide-containing gas, regenerate the total absorbent stream by reaction with lime to produce calcium sulfate and/or sulfite for disposal and sodium sulfite and hydroxide for return to the absorption system. These processes generally have the disadvantages of (a) input and disposal of calcium compounds, (b) losses of sodium in disposed calcium compounds, (c) and the above-mentioned disadvantage in that the absorbent stream contains only a small amount of the inactive sulfate component with which this type of regeneration is intended to deal. Further processes which have been developed or suggested for the recovery of sodium values treat total absorbent streams in reduction furnaces using petroleum coke or coal or other solid carbonaceous material to produce essentially sodium sulfide "green liquors" which must then be carbonated to obtain sodium carbonate and/or bicarbonate before return to the absorption system. These procedures have the disadvantage of treating the total absorbent stream, of which the inactive sulfate forms only a small part. The processes are also unattractive since impurities (such as heavy metals) may be introduced into the absorption system by the petroleum coke, coal or other solid carbonaceous material and the carbonation equipment is also extremely complex and expensive. The process of the present invention recovers useful active sodium values from the inactive sodium sulfate and/or sodium thiosulfate by a process which does not suffer from many of the disadvantages of the processes of the prior art.

In the method of the present invention, an aqueous medium containing sodium sulfate and/or sodium thiosulfate which medium may be a portion of the cycling absorption-desorption medium in the described sulfur dioxide removal processes employing an aqueous solution of sodium sulfite as the essential absorption medium, can be treated for recovery of sodium values present in the medium in the form of sodium sulfate and/or of sodium thiosulfate. The medium treated for recovery of sodium values in active form, which medium is usually substantially devoid of carbonates, is subjected to chemical reduction to provide an aqueous product whose total sodium content is composed to a major weight extent of carbonates, i.e., sodium carbonate and sodium bicarbonate, and generally to a minor extent of sodium bisulfide, on a dry basis. In this product the amount of carbonate is substantial and may often exceed the amount of bicarbonate present. In some systems this product may be acceptably returned to the sulfur dioxide absorption-desorption system, preferably after the removal of a portion of its water, but if the amount of sodium bisulfide is too great further treatment may be desirable. Thus the liquid product from the chemical reduction may be carbonated to increase the ratio of sodium bicarbonate to carbonate present. The increase in sodium bicarbonate content, and preferably a reduction in the amount of water present, facilitate the reaction of bicarbonate with sodium bisulfide to decrease the amount of the latter in the resulting carbonate-containing product in which most of the sodium is in a form which is active for reuse in the absorption-desorption system. The product gases from one or more of the reduction, carbonation and water removal treatments which may contain hydrogen sulfide, carbon oxides, and hydrogen, can be incinerated to produce a sulfur dioxide-containing gas which can be sent to the absorption stage of the process for the removal of sulfur dioxide. During the chemical reduction of the sulfate and/or thiosulfate-containing material a small amount of carbon may be formed, and the carbon is preferably separated from the liquid product, for instance, after the carbonation is performed. The carbon can be used as fuel in the chemical reduction stage or in other facilities which are generally present in the plant such as steam-generating boilers or the like. Accordingly, there need be no significant production of by-products requiring special handling or disposal facilities as the result of using the process of the present invention.

The amount of sodium sulfate purged from the sulfur dioxide removal system is generally sufficient to prevent undue build-up of sodium sulfate in the absorption-desorption system. Advantageously, in the present invention sufficient sulfate is purged to be substantially equal to the amount of sulfate being formed in the absorption-desorption system when taking into account any sulfate that may be removed from the system by other means. The sodium sulfate-containing aqueous medium which is chemically-reduced in accordance with the process of this invention contains a significant amount of sodium sulfate, for instance, at least about 5 weight percent. Advantageously, however, this medium contains at least about 15 weight percent of sodium sulfate, preferably about 20 to 40 weight percent, since as the sodium sulfate content increases a lesser amount of the material need be treated for a given conversion of inactive to active sodium form. Although the various sulfate-containing streams in the absorption-desorption system may be chemically-reduced in accordance with the process of this invention, the sulfate content may preferably be increased prior to chemical reduction. Most desirably, sulfate concentration is performed by employing solutions having a higher concentration of sodium bisulfite than sulfite, and it is preferred to employ a portion of the spent absorbing medium as a source of sulfate-containing feed to the chemical reduction stage of the process of this invention. Thus it is advantageous to use a source material having a sodium bisulfite to sodium sulfite mole ratio of at least about 2:1, preferably at least about 3:1. Such sulfate-containing aqueous media in the sulfur dioxide absorption-desorption system usually have a minor amount of sodium sulfate based on the total weight of the medium, and often this amount is about 1 to 10 weight percent. These solutions may also contain about 0.1 to 10 weight percent of sodium sulfite and about 15 to 40 weight percent of sodium bisulfite. The sodium sulfate content of these materials may with advantage be increased by at least about 10 weight percent based on the total sodium salts present, and preferably is at least about doubled before being subjected to chemical reduction. Advantageously, sodium sulfate is the largest or even the major salt component in the material which is chemically reduced for sulfate purging, e.g., the weight ratio of sodium sulfate to the total of other sodium compounds in the material may be at least about 1.1:1, preferably at least about 2.5:1. The amount of water in the aqueous salt composition which undergoes chemical reduction should generally be sufficient to provide a stirable and pumpable mixture or solution. The amount of water in the mixture may be the largest or even major weight component of the mixture, for example, about 45 to 80 weight percent of the total weight of the mixture, preferably about 55 to 65 weight percent.

The sodium sulfate content of the absorption-desorption medium which may serve as the source of the feed for the chemical reduction may be increased by various procedures. For example, a purge stream of spent absorption solution may be subjected to low temperature crystallization, say at a temperature of about 0° to 10° C., to obtain a solid phase which has a higher sodium sulfate content, on a dry basis, than in the spent absorption solution. The solid phase can be mixed with water to obtain an aqueous material suitable for chemical reduction in accordance with this invention. The mother liquor from the crystallization may contain a substantial amount of bisulfite and may be returned with advantage of the desorption stage of the sulfur dioxide removal process.

Preferred methods which can be used for concentration of sodium sulfate in the aqueous absorption-desorption medium include procedures involving the evaporation of water to obtain the precipitation of solids. Thus sulfate can be purged from the system by treating at least a portion of the absorption-desorption medium to remove a sufficient amount of water to precipitate a significant, but limited, amount of solids in the medium. The evaporation of water can preferably be conducted in a manner to form up to about 10 weight percent crystals in the absorption-desorption medium, and this amount may be up to about 20 weight percent especially when the evaporation is performed while contacting the medium with added sulfur dioxide-containing gas. The sulfur dioxide-containing gas is preferably unsaturated with respect to water. Most often the amount of solids precipitated in these various procedures is at least about 1 weight percent of the medium, most preferably about 2 to 8 weight percent.

In one embodiment of the invention substantially the entire absorption-desorption medium may be processed for water removal and sulfate precipitation. Preferably, only a portion of this medium is treated, and in such case frequently about 10 to 90 weight percent of the total medium is processed in this manner, more often about 20 to 75 weight percent. Preferably, this amount is sufficient so that a maximum of about 5 weight percent solids need be precipitated to have an adequate purge of sodium sulfate. The liquid medium or mother liquid separated in the sulfate removal procedure is usually passed to the sulfur dioxide desorption stage since the liquid is high in bisulfite content although it may be desirable to charge it to some other part of the absorption-desorption system.

Temperatures suitable for accomplishing the desired evaporation of water are usually elevated and preferably sufficient to precipitate essentially non-hydrated crystals without excessive water removal. Generally such temperatures are at least about 37° to 38° C., and to be more certain of obtaining a non-hydrated product temperatures of at least about 40° C. are recommended. Suitable temperatures include about 40° to 110° C., preferably about 40° to 75° C. The choice of temperature may depend on the pressure employed, and the pressure may be ambient, reduced or elevated. Advantageously, the pressure is about 10 to 20 psia, and preferably approximately atmospheric pressure is used.

The slurry obtained in the water removal operation can be subjected to a liquid-solid separation procedure to provide a separate, essentially solid phase which is relatively high in sulfate content and suitable for use as a feed material to the chemical reduction operation of the method of this invention. The separation may be done without substantially reducing the temperature of the slurry, and the temperature may often be about 40° to 110° C., preferably about 40° to 75° C. The separated liquid phase or mother liquor can be charged to the absorption-desorption system, and preferably to the desorption zone.

Suitable processes for concentrating the sulfate content of materials derived from the above-described sulfur dioxide absorption-desorption systems by limited precipitation of solids through the evaporation of water from such materials are described in U.S. Pat. applications, Ser. No. 630,503 filed Nov. 10, 1975 in the names of Norman E. Nicholson, John Scarlett and John Frederick Flintoff, and Ser. No. 647,516, filed Jan. 8, 1976, in the names of Edgar E. Bailey, Norman E. Nicholson, John Scarlett and John Frederick Flintoff, both applications being herein incorporated by reference. Other suitable procedures for obtaining solids of increased sodium sulfate content which involve the use of sulfur dioxide-containing gases are described in U.S. Pat. applications Ser. No. 433,326, filed Feb. 19, 1974, in the name of Raymond T. Schneider U.S. Pat. No. 3,971,844; and Ser. No. 637,954, filed Dec. 5, 1975 in the name of William R. Parish.

In accordance with the process of this invention chemical reduction is an operation involved in the recovery of active sodium from sodium sulfate and/or sodium thiosulfate-containing materials. In this context active sodium refers to a sodium compound or compounds which, upon charging to the absorption-desorption system, can participate in the recovery of sulfur dioxide from sulfur dioxide-containing gases. The chemical reduction of sulfate and/or thiosulfate-containing materials is of the type which provides a product whose sodium content is to a major weight extent in the form of sodium carbonates, and usually the carbonates have a greater amount of carbonate than bicarbonate. The reduction can be accomplished by subjecting an aqueous material containing one or both of sodium sulfate and sodium thiosulfate, to a reducing atmosphere under reducing conditions at elevated temperature, e.g., about 800° to 1050° C., preferably about 850° to 950° C. Advantageously, this operation involves the use of a reducing incinerator in which the elevated temperature is maintained by burning a fuel in the presence of less than a stoichiometric amount of oxygen to convert the fuel to carbon dioxide and water, say less than about 90 volume percent, preferably about 65 to 80 volume percent, of the amount. The oxygen may be supplied as air or other molecular oxygen-containing gas. Often a major amount, preferably at least about 75 percent, of the sodium sulfate and/or sodium thiosulfate present is converted to other materials such as sodium bisulfide and the sodium carbonates. The major amount of any sodium bisulfite or sulfite present may also be converted to such materials. Suitable fuels are fluids, i.e., gases or liquids under normal conditions, and may include hydrocarbons. Some of these fuels may contain up to about seven or more carbon atoms. The fuel may have a heating value of at least about 150 B.T.U.'s per cubic foot. The fuel may be methane, a hydrocarbon liquid such as fuel oil, or a relatively low BTU-fuel which may contain substantial quantities of carbon monoxide, carbon dioxide, and hydrogen along with a small amount, if any, of hydrocarbon. A typical fuel of this type may be gas from a Winkler coal gasification process such as water gas produced from a Winkler generator and containing, for example, 21% $CO_2$, 38% CO, 39% $H_2$, 1.5% $CH_4$ and 0.5% $N_2$ (volume % on a dry basis) and having a heating value of 263.5 BTU per standard cubic foot.

A preferred manner of conducting the reduction is by use of a submerged combustion incinerator such as a Nittetu incinerator which is described in "Waste Liquid Incineration and Valuable Recovery in Chemical Industry", *Chemical Economy and Engineering Review*, Vol. 4, No. 12 (No. 56), pp. 45–51, December, 1972, see also U.S. Pat. No. 3,887,682. Under submerged incineration conditions the fuel and oxygen-containing gas undergoing combustion and any other gases are mixed with the aqueous sulfate and/or thiosulfate-containing material or materials which have been atomised by steam or other gaseous fluid and introduced into the high temperature combustion zone, and the desired conversion is obtained. The combustion and reduction products are then immediately cooled by being submerged in a liquid aqueous phase maintained in a product quench tank. The quenching medium is generally previously prepared product in aqueous form, and water may be added separately to the quench tank to maintain the desired temperature and water content. For example, the concentration of salts in the quench tank liquid may be about 10 to 25 weight percent, preferably about 15 to 20 weight percent. The temperature of the quench tank liquid may be, for example, about 60° to 115° C., preferably about 80° to 110° C. The choice of temperature may depend on the pressure employed, and the pressure may be ambient, reduced or elevated. Preferably approximately atmospheric pressure is used. Other incineration systems can, however, be employed but it is desirable for the burner which produces reducing conditions to be separate from the injector for the aqueous sulfate and/or thiosulfate-containing material or materials treated.

In the incinerator the fuel-to-air ratio to the burner for combustion is adjusted to give an overall reducing atmosphere in the incinerator when no aqueous salt medium or atomizing steam is charged. Other reducing gases may be charged to the incinerator and the combustion products may contain, for example, approximately 10% by volume of carbon monoxide, 10% by volume of hydrogen and 8% by volume of carbon dioxide. A methane and air mixture containing approximately 70 to 75% of the stoichiometric quantity of air for complete combustion is found to be suitable in a top-fired incinerator. The concentration of salts in the feed solution or slurry charged for treatment may often be in the range of about 25 to 50% by weight, and it is an advantage if the sulfate liquor from any preliminary concentration operation be used without being either further concentrated or diluted before incineration. This is possible with, for example, a sulfate liquor containing about 42 weight percent of total salts.

The average residence time of a salt particle in the incinerator may preferably not be less than about 1.5 seconds. The feed solution or slurry may be atomized with steam or other gaseous fluid in order to provide a fine distribution of particles within the incinerator to intimately admix this feed with the combustion gases. It may not be a disadvantage if some of the salts are sprayed onto the internal walls of the reactor, and subsequently collect in the quench tank or salt recovery drum by downward flow in the molten state.

The sodium thiosulfate formed in the absorption-desorption medium of the sulfur dioxide removal system may be adequately purged by the treatment to control sodium sulfate, but a separate stream containing thiosulfate may be withdrawn from the absorption-desorption system and charged to the chemical reduction stage of the process of this invention for thiosulfate removal. Generally, if such thiosulfate removal is done this feed to the reduction is treated along with a purge stream for sulfate control, but one may conduct the reduction on either stream above. An especially suitable thiosulfate-containing material is the liquid phase from the sulfur dioxide desorption zone in the absorption-desorption cycle. Aside from sodium bisulfite which is generally the major salt component dissolved in such solutions, they contain minor amounts of sodium thiosulfate, e.g. about 0.5 to 15 weight percent, or about 1.2 to 12 weight percent, on a dry basis. The salts may also contain minor amounts of sodium sulfite and sodium sulfate. The liquid phase may, for example, contain about 40 to 50 weight percent of total salts. If this procedure is employed to control the thiosulfate content of the system, sufficient of the thiosulfate-containing solution can be charged to the chemical reduction to prevent undue build-up of thiosulfate, and preferably the amount of solution treated for reduction is sufficient to purge substantially the same amount of thiosulfate from the absorption-desorption system that is being produced after taking into account the amount of thiosulfate being removed by other means, e.g. due to the purging of sodium sulfate.

In some situations the use of chemical reduction as described above may be adequate for purging sodium sulfate and/or sodium thiosulfate from the sulfur dioxide absorption-desorption system and recovering sodium values, especially if the concentration of salts in the liquid product from the quench tank is increased somewhat, say by at least about 25 weight percent, by the evaporation of water before charging to the absorption-desorption system, but in many instances it may be desirable to subject the said liquid product to carbonation to convert a substantial amount of the carbonate to bicarbonate and as a result usually obtain a product containing a greater amount of bicarbonate than carbonate. This is particularly the case if the amount of sodium bisulfide formed in the chemical reduction leads to excessive build-up of this material or of sodium thiosulfate which may be produced in the system through the reaction of sodium bisulfide with sodium sulfite. In the carbonation treatment, liquid from the chemical reduction can be carbonated at elevated temperature by contact with a carbon dioxide-containing gas, having, say, a carbon dioxide partial pressure of about 1 to 20 psi. Suitable carbonation temperatures include about 30° to 100° C., preferably about 35° to 75° C. The carbonation is conducted at pressures sufficient to maintain the liquid phase, e.g., about 2 to 45 psig, and usually the concentration of total salts is a minor amount of the material treated, preferably about 10 to 35 weight percent. The extent of carbonation is often sufficient to form a product in which the weight ratio of sodium bicarbonate to sodium carbonate is about 1.5 to 3:1. The carbonated liquid is then treated to react the major portion, preferably at least about 75, or even at least about 90, weight percent of the sodium bisulfide with sodium bicarbonate. This can be done at elevated temperatures, say about 60° to 110° C., preferably about 80° to 105° C. The choice of temperature may depend on the pressure employed, and the pressure may be ambient, reduced or elevated. Preferably approximately atmospheric pressure is used. The liquid is, preferably, subjected to evaporation, usually at the same time, to increase its salt content by a substantial amount, e.g., by at least about 25 weight percent up to about 75 weight percent or more. The material remaining after the evaporation of water may be returned to the sulfur dioxide absorption-desorption system after, for instance, separation of gases and any insolubles present such as carbon. The off-gases from the carbonation and evaporation stages may contain hydrogen sulfide and they may be incinerated or oxidized, along with, for instance, gas from the chemical reducing-quenching operation to form sulfur dioxide which can be recovered by charging to the absorption zone to the sulfur dioxide absorption-desorption cycle.

In the sulfur dioxide desorption stage of the method of this invention the spent absorption medium is subjected to elevated temperatures to convert sodium bisulfite into sodium sulfite with the concomitant formation of a vapor phase containing sulfur dioxide and water. Suitable temperatures for this operation include about 40° to 110° C., preferably about 60° to 95° C. The pressure may be, for example, about 3 to 21 psia, preferably about 8 to 15 psia. The vapor phase can be treated for the recovery of purer sulfur dioxide, the manufacture of sulfur, or used, treated or disposed of in any other suitable manner. Various procedures for sulfur dioxide desorption can be used and a number are known in the art. It is preferred, however, that the desorption be accomplished with the simultaneous formation of an undissolved solids or crystal phase which enables the desorption to be accomplished with the use of lesser amounts of heat. In such operations the amount of undissolved solids in the desorption zone is generally at least about 15 weight percent of the slurry undergoing decomposition or sulfur dioxide desorption. As described in U.S. Pat. No. 3,790,660 the amount of such solids is advantageously at least about 25 weight percent in order to alleviate difficulties of tube fouling, particularly when supplying heat to the desorption zone by passing the slurry through the tubes of an indirect heat exchanger. Preferably, the amount of undissolved solids is about 30 to 50 weight percent of the slurry undergoing decomposition. Also when the amount of undissolved solids is sufficiently high, the sodium sulfite content of the slurry may be adequate for a portion of the total slurry to be combined with water to dissolve the solids, and the resulting solution can be used as the lean solution for absorbing sulfur dioxide from the gas being treated in the absorption zone of the absorption-desorption system. The lean absorbing solution is usually composed to a major weight extent of sodium sulfite and minor weight amounts of sodium bisulfite and sodium sulfate based on the total amount of these salts present. Often the lean absorbing solution has about 10 to 35 weight percent sodium sulfite, about 3 to 15 weight percent sodium bisulfite, and about 1 to 10 weight percent sodium sulfate based on these components and water present.

The accompanying flow sheet represents diagrammatically and by way of example, one form of sulfur dioxide removal or recovery system in accordance with the present invention.

A main power plant is represented at 10 and is supplied by fuel through line 11. The plant produces a sulfur dioxide-containing flue gas in line 12 which is passed to an absorption vessel 13 from which desulfurized off-gas is discharged by line 14. Spent absorption liquid containing sodium bisulfite, sodium sulfite and sodium sulfate passes from vessel 13 by line 15 to the regeneration or desorption vessel 16 from which regenerated absorption liquor returns by line 17 to absorption vessel 13. Sulfur dioxide is removed from the desorption vessel 16 by line 18.

A purge stream of spent absorption liquor may be taken from line 15 by line 19 to a water evaporation, crystallization or other sulfate concentration stage represented at 20, and the mother liquor obtained from stage 20 is returned by line 21 to the regenerator or desorption vessel 16 by passage into line 15 at a point downstream of line 19. The sulfate concentrate from the concentration stage, containing about 40% or more weight percent of total salts is passed by line 22 to the reducing incinerator represented at 23 which is preferably gas-fired from line 24, for example, by a mixture of methane and air passing to a burner separate from the injector for concentrated sulfate. The mixed products of combustion and chemical reduction pass downwards into the quench tank or salt recovery drum 25 of the incinerator 23 to form a carbonate-rich green liquor which then travels by line 26 to a carbonation stage represented at 27 and to which carbon dioxide is supplied by line 28. Carbon dioxide and hydrogen sulfide are removed from carbonator 27 by line 29.

The treated liquor from the carbonation proceeds by line 30 to an evaporator 31 and thence by line 32 to filter 33 for removal of carbon, from which the carbonated salt passes by line 34 to the line 17 containing regenerated absorption liquor. Carbon from filter 33 may be removed by line 35 and charged to the fuel supply line 11, while effluent gas from the evaporator 31 containing carbon dioxide, hydrogen sulfide and steam is removed by line 36 to which is added the gases from line 29. The combined gases pass by line 37 to a cooling, condensing and separation stage represented at 38 from which the resulting aqueous stream is passed by line 39 to the quench tank 25. In line 40 an effluent gas from the chemical reduction containing hydrogen sulfide, carbon oxides and nitrogen is passed between the quench tank 25 and line 37 for treatment of the latter gases also in stage 38. Carbon oxides, i.e. carbon monoxide and carbon dioxide, nitrogen and hydrogen sulfide from stage 38 are passed through line 41 to an oxidizing incinerator represented at 42 to which air or other oxygen-containing gas is charged to convert hydrogen sulfide to sulfur dioxide, and one or both of carbon monoxide to carbon dioxide and hydrogen to steam at elevated oxidizing temperatures. Outlet gases pass from stage 42 by line 43 to join gases in line 12 for sulfur dioxide removal.

A small purge stream may be taken from the regenerator 16 by line 44 and fed to line 22 or direct to reducing incinerator 23 in place of, or in addition to, the material from stage 20, and this is done to effect purge of sodium thiosulfate and maintain this compound at a desirably low level in the system. A variation of the above system may be made by the recycling of carbon residues in line 35 from the filter 33, back to the incinerator 23 as part of the fuel requirement, rather than to the main fuel line 11. Proper conditions must then however still be maintained in the incinerator 23 to secure conversion of the primary sodium sulfate and/or thiosulfate-containing feedstock to a carbonated salt.

The present invention will be further illustrated by the following example. A composite is made of a sodium sulfate concentrate of the type in line 22 of the drawing and a sodium thiosulfate control purge stream of the type in line 44 of the drawing. The components of each of these streams and the combined stream are approximately as follows:

| Component | Sulfate Concentrate Wt. % | Composite Wt. % (Approx. Range) | Thiosulfate Purge |
|---|---|---|---|
| $Na_2SO_3$ | 4.4 | 4.7 (3–6.5) | 5.1 |
| $NaHSO_3$ (calc. as $Na_2S_2O_5$) | 0.13 | 15.0 (10–20) | 30.6 |
| $Na_2SO_4$ | 36.2 | 21.0 (15–27) | 5.0 |
| $Na_2S_2O_3$ | .01 | 0.7 (0.2–1.2) | 1.5 |
| $H_2O$ (difference) | 59.26 | 58.6 (55–60) | 57.8 |

The resulting mixture is a slurry which can be atomized by steam injection into a top-fired, vertical, submerged combustion incinerator in which methane is burned at about 900° C. with about 72% of the theoretical amount of air required for complete combustion to thereby maintain a reducing atmosphere. Alternatively the composite can be diluted with water to obtain an essentially complete solution of about 25 to 35 weight percent salts, and the solution chemically reduced under conditions similar to those employed in treating the slurry feed. The products of combustion and chemical reduction are quenched in a collection tank containing previously obtained product solution. The quench tank liquid is typically comprised approximately of the following:

| Component | Wt. % (Approx. Range) |
|---|---|
| $Na_2SO_3$ | 0.6 (0.2–1.2) |
| $NaHSO_3$ (calc. as $Na_2S_2O_5$) | Nil |
| $Na_2SO_4$ | 2.8 (1–4.5) |
| $Na_2S_2O_3$ | 0.1 (0.02–0.2) |
| $Na_2CO_3$ | 8.3 (5–12) |
| $NaHCO_3$ | 4.5 (3–7) |
| NaHS | 1.8 (0.5–2.5) |
| $H_2O$ (by difference) | 82.0 (75–85) |

The quench tank liquid is then evaporated at 105° C. to remove water and obtain a liquid of the following approximate composition:

| Component | Wt. % (Approx. Range) |
|---|---|
| $Na_2SO_3$ | 1.2 (0.4–2.4) |
| $NaHSO_3$ (calc. as $Na_2S_2O_5$) | Nil |
| $Na_2SO_4$ | 5.9 (2–9) |
| $Na_2S_2O_3$ | 0.2 (0.04–0.4) |
| $Na_2CO_3$ | 21.1 (15–27) |
| $NaHCO_3$ | 3.4 (2–5) |
| NaHS | 1.2 (0.5–2) |
| $H_2O$ (by difference) | 67.0 (60–70) |

The evaporation of water at elevated temperature serves to react a portion of the sodium bicabonate with sodium bisulfide to form sodium carbonate. The amount of the sodium carbonate is also increased by decomposition of sodium bicarbonate. The removal of sodium bisulfide is beneficial since when the liquid is used in the sulfur dioxide absorption-desorption cycle the bisulfide is a precursor of sodium thiosulfate through reaction with sodium sulfite.

If the amount of bisulfide remaining in the liquid is such that there would be an undesirable build-up of thiosulfate in the sulfur dioxide absorption-desorption cycle when the liquid from the evaporation is recycled, the quench tank liquor can be carbonated by contact with carbon dioxide at about 40° C. and water evaporated from the carbonated liquid to reduce the amount of sodium bisulfide present. The composition of the liquor obtained from the carbonation may typically be approximately as follows:

| Component | Wt. % (Approx. Range) |
|---|---|
| $Na_2SO_3$ | 0.5 (0.2–1.2) |
| $NaHSO_3$ (calc. as $Na_2S_2O_5$) | Nil |
| $Na_2SO_4$ | 2.8 (1–4.5) |
| $Na_2S_2O_3$ | 0.1 (0.02–0.2) |
| $Na_2CO_3$ | 5.2 (2–10) |
| $NaHCO_3$ | 9.1 (5–16) |
| NaHS | 1.8 (0.5–2.5) |
| $H_2O$ (by difference) | 80.5 (75–85) |

Thus carbonation serves to convert sodium carbonate to bicarbonate which in turn may react with sodium bisulfide, especially at slightly elevated temperatures such as those used to evaporate water from the mixture. Evaporation of water from this liquor at 50° C. to the point where the salt content is increased by about 71% gives about 94.5% reduction in the amount of sodium bisulfide present and typically a liquor of the following approximate composition:

| Component | Wt. % (Approx. Range) |
|---|---|
| $Na_2SO_3$ | 1.2 (0.5–3) |
| $NaHSO_3$ (calc. as $Na_2S_2O_5$) | Nil |
| $Na_2SO_4$ | 6.0 (2.5–10) |
| $Na_2S_2O_3$ | 0.1 (0.05–0.3) |
| $Na_2CO_3$ | 19.7 (15–25) |
| $NaHCO_3$ | 6.3 (3–10) |
| NaHS | 0.1 (0.01–0.2) |
| $H_2O$ (by difference) | 66.6 (60–70) |

This liquor can be charged to the lean absorption solution stream passing to the absorption zone of an absorption-desorption system for removing sulfur dioxide from the gases. Thus according to the method of this invention there need be no significant loss of sodium values from the system due to the formation of sodium sulfate and sodium thiosulfate.

It is claimed:

1. In a process for the removal of sulfur dioxide from gas in which sulfur dioxide is absorbed from the gas into an aqueous absorption solution of sodium sulfite to form the corresponding bisulfite, the resulting bisulfite-containing absorption solution is desorbed to form sulfur dioxide, a sulfite-containing absorption solution is regenerated for recycling, and in which sodium sulfate is in the absorption-desorption medium, the improvement for reducing the amount of sodium sulfate in the system comprising chemically-reducing an aqueous solution or slurry containing a major amount of sodium sulfate on a dry basis, separated as a purge from said absorption-desorption system by contacting said aqueous solution or slurry with a reducing atmosphere under reducing conditions at an elevated temperature, quenching the resulting mixture and obtaining an aqueous liquid product which contains a major amount of the total sodium content as carbonate and bicarbonate and a minor amount as bisulfide on a dry basis, carbonating said aqueous liquid product to increase substantially the amount of sodium bicarbonate therein, decreasing the amount of sodium bisulfide in said carbonated liquid product by a major amount, and passing resulting liquid product to said sulfur dioxide absorption-desorption system.

2. A process of claim 1 in which said chemical reduction is conducted at a temperature of about 800° to 1050° C.

3. A process of claim 6 in which said quenching comprises passing products of said combustion into a quench liquid comprising material previously prepared by said chemical reduction.

4. The process of claim 1 in which the weight ratio of sodium sulfate to the total amount of other sodium compounds in said aqueous medium which is chemically-reduced is at least about 2.5:1.

5. A process of claim 1 in which aqueous liquid containing a minor amount of sodium thiosulfate is withdrawn from the desorption zone of said sulfur dioxide absorption-desorption system and also charged to said chemical reduction.

6. The process of claim 1 in which said decrease in the amount of sodium bisulfide is accomplished during evaporation of water from said carbonated aqueous liquid product.

7. The process of claim 6 in which the amount of water evaporated is sufficient to increase the total salt content of the material undergoing treatment by at least about 25 weight percent.

8. In a process for the removal of sulfur dioxide from gas in which sulfur dioxide is absorbed from the gas into an aqueous absorption solution of sodium sulfite to form the corresponding bisulfite, the resulting bisulfite-containing absorption solution is desorbed to form sulfur dioxide, a sulfite-containing absorption solution is regenerated for recycling, and in which sodium sulfate is in the absorption-desorption medium, the improvement for reducing the amount of sodium sulfate in the system comprising separating a material containing a major amount of sodium sulfate on a dry basis from spent absorption medium having a major amount of sodium bisulfite on a dry basis, chemically-reducing an aqueous solution or slurry containing said sodium sulfate separated from said spent absorption-desorption medium, by burning a fluid fuel with less than the stoichiometric amount of oxygen for complete combustion of said fuel, to obtain a reducing atmosphere and contacting said aqueous solution or slurry with said reducing atmosphere under reducing conditions at an elevated temperature, quenching the resulting mixture and obtaining an aqueous liquid product which contains a major amount of the total sodium content as carbonate and bicarbonate and a minor amount of sodium bisulfide on a dry basis, carbonating said quenched aqueous liquid product to increase substantially the amount of sodium bicarbonate therein, decreasing the amount of sodium bisulfide in said carbonated liquid product by a major amount, and passing resulting liquid product to said sulfur dioxide absorption-desorption system.

9. The process of claim 8 in which said decrease in the amount of sodium bisulfide is accomplished during evaporation of water from said carbonated aqueous liquid product.

10. The process of claim 9 in which the weight ratio of sodium sulfate to the total amount of other sodium compounds in said aqueous medium which is chemically-reduced is at least about 2.5:1.

11. The process of claim 10 in which aqueous material subjected to carbonation consists essentially of about 10 to 35 weight percent of total sodium salts.

12. A process of claim 8 in which said chemical reduction is conducted at a temperature of about 800° to 1050° C.

13. A process of claim 12 in which said quenching comprises passing products of said combustion into a quench liquid of material previously prepared by said chemical reduction.

14. A process of claim 9 in which gas produced during said evaporation of water is oxidized to form sulfur dioxide from hydrogen sulfide therein, and resulting sulfur dioxide containing gas is passed to the absorption zone of said sulfur dioxide absorption-desorption system.

15. A process of claim 14 in which gas from said carbonation is also charged to said oxidation in which sulfur dioxide is formed.

16. A process of claim 15 in which gas from said quenching is also charged to said oxidation in which sulfur dioxide is formed.

17. A process of claim 9 in which said aqueous liquid containing a minor amount of sodium thiosulfate is withdrawn from the desorption zone of said sulfur dioxide absorption-desorption system and also charged to said chemical reduction.

18. The process of claim 12 in which said quenched aqueous liquid product contains a greater weight amount of sodium carbonate than sodium bicarbonate, and said quenched aqueous liquid product is carbonated to increase the weight ratio of sodium bicarbonate to sodium carbonate to at least about 1.5:1.

19. A process of claim 18 in which aqueous liquid containing a minor amount of sodium thiosulfate is withdrawn from the desorption zone of said sulfur dioxide absorption-desorption system and also charged to said chemical reduction.

20. The process of claim 18 in which said decrease in sodium bisulfide content of said carbonated liquid occurs while evaporating water therefrom.

21. The process of claim 20 in which the amount of water evaporated is sufficient to increase the total salt content of the material undergoing treatment by at least about 25 weight percent.

22. In a process for the removal of sulfur dioxide from gas in which sulfur dioxide is absorbed from the gas into an aqueous absorption solution of sodium sulfite to form the corresponding bisulfite, the resulting bisulfite-containing absorption solution is desorbed to form sulfur dioxide, a sulfite-containing absorption solution is regenerated for recycling, and in which sodium sulfate is in the absorption-desorption medium, the improvement for reducing the amount of sodium sulfate in the system comprising separating a material containing a major amount of sodium sulfate on a dry basis from spent absorption medium having a major amount of sodium bisulfite on a dry basis, chemically-reducing an aqueous solution or slurry containing said sodium sulfate separated from said spent absorption-desorption medium by burning a fluid fuel with less than the stoichiometric amount of oxygen for complete combustion of said fuel, at a temperature of about 800° to 1050° C. to obtain a reducing atmosphere and contacting said aqueous solution or slurry with said reducing atmosphere under reducing conditions at an elevated temperature, quenching the resulting mixture by contact with previously prepared product of said chemical reduction at a temperature of about 60° to 115° C., and carbonating said quenched aqueous liquid product at a temperature of about 30° to 100° C. to form a product in which the weight ratio of sodium bicarbonate to sodium carbonate is at least about 1.5:1, evaporating water from the carbonated product at a temperature of about 60° to 110° C. to increase the salt content of the carbonated product by at least about 25%, and passing resulting liquid product to said sulfur dioxide absorption-desorption system.

* * * * *

UNITED STATES PATENT OFFICE
CERTIFICATE OF CORRECTION

Patent No. 4,079,119  Dated March 14, 197

Inventor(s) Norman E. Nicholson and John Scarlett

It is certified that error appears in the above-identified patent and that said Letters Patent are hereby corrected as shown below:

Column 1, line 18, at the end of the line following "and", delete the hyphen.

Column 5, line 55, delete "of" first occurrence and substitute therefor -- to --.

Column 6, line 18, delete "liquid" and substitute therefor --liquor--.

Column 6, line 62, delete "433,326" and substitute therefor --443,326--.

Column 9, line 31, following "is", insert --at least about 1.5:1, e.g.,--.

Column 9, line 53, following "zone", delete "to" and substitute therefor --of--.

Claim 3, line 1, delete "6" and insert therefor --2--.

Signed and Sealed this

Twenty-sixth Day of September 1978

[SEAL]

Attest:

RUTH C. MASON
Attesting Officer

DONALD W. BANNER
Commissioner of Patents and Trademarks